United States Patent
Onimatsu

(10) Patent No.: US 10,632,698 B2
(45) Date of Patent: Apr. 28, 2020

(54) TIRE VULCANIZING APPARATUS

(71) Applicant: Sumitomo Rubber Industries, Ltd., Hyogo (JP)

(72) Inventor: Hiroyuki Onimatsu, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 0 days.

(21) Appl. No.: 16/199,275

(22) Filed: Nov. 26, 2018

(65) Prior Publication Data

US 2019/0193353 A1    Jun. 27, 2019

(30) Foreign Application Priority Data

Dec. 21, 2017 (JP) .................. 2017-245418

(51) Int. Cl.
   *B29D 30/06* (2006.01)

(52) U.S. Cl.
   CPC ...... *B29D 30/0605* (2013.01); *B29D 30/0606* (2013.01)

(58) Field of Classification Search
   CPC .............. B29D 30/0605; B29D 30/0606
   USPC ........................................ 425/47
   See application file for complete search history.

(56) References Cited

U.S. PATENT DOCUMENTS

| | | | | |
|---|---|---|---|---|
| 4,453,902 A * | 6/1984 | Imbert | ............... | B29D 30/0601 425/28.1 |
| 4,686,129 A * | 8/1987 | Yokoyama | ......... | B29D 30/0605 425/47 |
| 4,927,344 A * | 5/1990 | Amano | ............... | B29D 30/0601 425/28.1 |
| 5,316,458 A * | 5/1994 | Lesneski | ............ | B29D 30/0601 425/34.1 |
| 8,282,373 B2 * | 10/2012 | Fujieda | ............... | B29D 30/0601 425/47 |
| 9,757,914 B2 * | 9/2017 | Onimatsu | ........... | B29D 30/0005 |

FOREIGN PATENT DOCUMENTS

JP      2014-046645 A      3/2014

\* cited by examiner

*Primary Examiner* — James P Mackey
(74) *Attorney, Agent, or Firm* — Studebaker & Brackett PC

(57) ABSTRACT

A tire vulcanizing apparatus includes a vulcanization mold including a lower mold and an upper mold to define a tire mold cavity for vulcanizing a green tire together with a rigid core on which the green tire is formed, a base portion, a lower plate to which the lower mold is attached, the lower plate supported by the base portion, a first ring having a circular shape with a center corresponding to an axial center of the vulcanization mold and arranged between the base portion and the lower plate, an upper plate to which the upper mold is attached so as to face the lower mold up and down, and a lifting device for moving the upper plate up and down between a lower location to close the vulcanization mold and an upper location in which the upper mold positions opening the vulcanization mold.

7 Claims, 8 Drawing Sheets

TIRE VULCANIZING APPARATUS

BACKGROUND ART

Field of the Disclosure

The present disclosure relates to a tire vulcanizing apparatus comprising a vulcanization mold capable of vulcanizing a green tire together with a rigid core on which the green tire is formed.

Description of the Related Art

The following Patent document 1 discloses a tire vulcanizing apparatus including a vulcanization mold capable of vulcanizing a green tire together with a rigid core on which the green tire is formed.

As illustrated in FIG. 8, the above-mentioned tire vulcanizing apparatus (a) includes a lower plate (c1) to which a lower mold (b1) is attached, the upper plate (c2) to which the upper mold (b2) is attached, and a lifting device (d) for supporting the upper plate (c2) movably up and down, wherein when the lifting device (d) moves downward, the upper and lower molds (b2) and (b1) are in contact with each other to close the vulcanization mold (b).

The lifting device (d) includes a pair of vertically extending tie rods (e) for movably supporting the upper plate (c2), and a pair of cylinders (f) having expandable rods. The pair of cylinders (f) is supported by the lower plate (c1) and the rods thereof are connected to the upper plate (c2).

Unfortunately, in such apparatus (a), when closing the upper and lower molds (b2) and (b1) tightly, pressure to close the vulcanization mold tends to concentrate on a central region of the vulcanization mold (b) (i.e., the axial center side), and thus decreasing the life of vulcanization mold (b). The above-mentioned pressure concentration on the central region of the vulcanization mold (b) does not occur in conventional vulcanizations in which green tires arranged in vulcanization molds are inflated by fluid pressure, since the pressure for closing the upper and lower molds is dispersed by pressure for inflating the green tires. On the other hand, in tire vulcanization process using the rigid core (g), it is supposed that the pressure for closing the upper and lower molds cannot be dispersed, and thus it concentrates on the above region.

Patent Document

[Patent document 1] Japanese Unexamined Patent Application Publication 2014-46645

SUMMARY OF THE DISCLOSURE

In view of the above problems in the conventional art, the present disclosure has an object to provide a tire vulcanizing apparatus capable of dispersing pressure acting on the vulcanization mold to prolong the life thereof.

According to an aspect of the disclosure, a tire vulcanizing apparatus includes a vulcanization mold including a lower mold and an upper mold to define a tire mold cavity for vulcanizing a green tire together with a rigid core on which the green tire is formed, a base portion, a lower plate to which the lower mold is attached, the lower plate supported by the base portion, a first ring having a circular shape with a center corresponding to an axial center of the vulcanization mold and arranged between the base portion and the lower plate, an upper plate to which the upper mold is attached so as to face the lower mold up and down, and a lifting device for moving the upper plate up and down between a lower location in which the upper mold is in contact with the lower mold to close the vulcanization mold and an upper location in which the upper mold positions opening the vulcanization mold. The lifting device includes a pair of tie rods extending vertically from the base portion, a horizontal reinforcing beam movably guided by the pair of tie rods and supporting the upper plate integrally, and a second ring having a circular shape with a center corresponding to the axial center of the vulcanization mold and arranged between the reinforcing beam and the upper plate.

In another aspect of the disclosure, outer diameters of the first ring and the second ring may be smaller than that of the vulcanization mold.

In another aspect of the disclosure, the lifting device may further include a pair of expandable and reducible cylinders, one end side of the pair of cylinders being connected to the base portion, and the other end side of the pair of cylinders being connected to the reinforcing beam.

In another aspect of the disclosure, the lifting device may further include clamp devices, wherein the clamp devices are attached to the reinforcing beam and clamp the pair of tie rods at the lower location and the upper location.

DESCRIPTION OF THE PREFERRED EMBODIMENTS

An embodiment of the present invention will be explained below with reference to the accompanying drawings.

Figure 1:
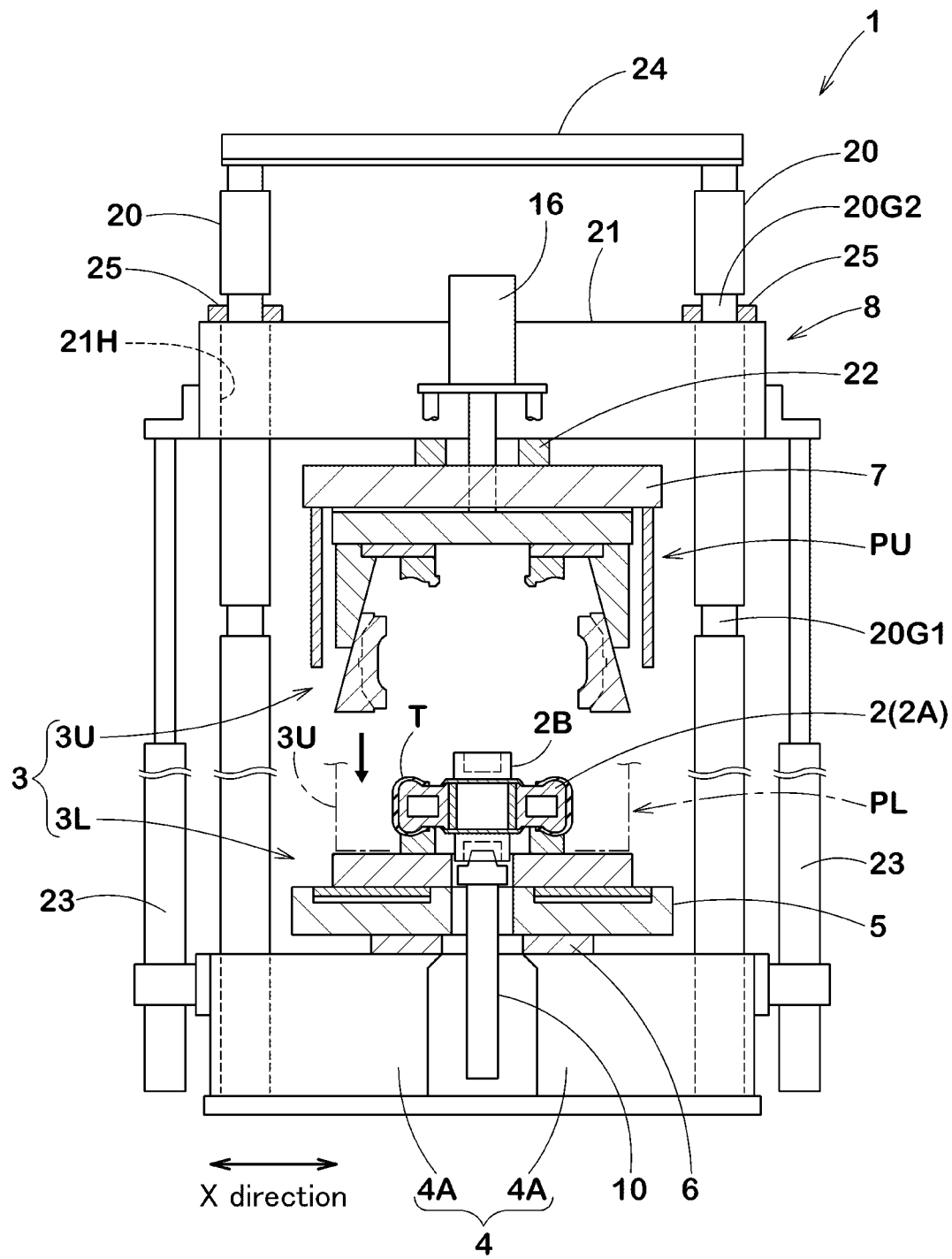
FIG. 1 is a front view of a tire vulcanizing apparatus according to an embodiment of the disclosure.

As illustrated in FIG. 1, a tire vulcanizing apparatus 1 according to an embodiment, includes a tire mold 3, a base portion 4, a lower plate 5, a first ring 6, an upper plate 7, and a lifting device 8. The tire vulcanizing apparatus 1 can vulcanize a green tire T put in the tire mold 3 together with a rigid core 2 on which the green tire T is formed.

The rigid core 2 is an internal mold, and which includes a core main body 2A having an outer surface for molding an inner surface of a tire to be molded.

The green tire T is formed on the core main body 2A by arranging various tire members sequentially thereon. For the rigid core 2, conventional one can be used. In this embodiment, the rigid core 2 includes a pair of central axes 2B which protrudes axially both ends from both side faces of the core main body 2A. The lower central axis 2B is detachably attached to a central mechanical device 10 supported by the base portion 4.

The vulcanization mold 3 includes a lower mold 3L attached to the lower plate 5 and an upper mold 3U attached to the upper plate 7 to define a tire mold cavity for vulcanizing the green tire T with the rigid core 2. For these lower and upper molds 3U and 3L, it is not particularly limited, but conventional molds can be used.

Figure 3:
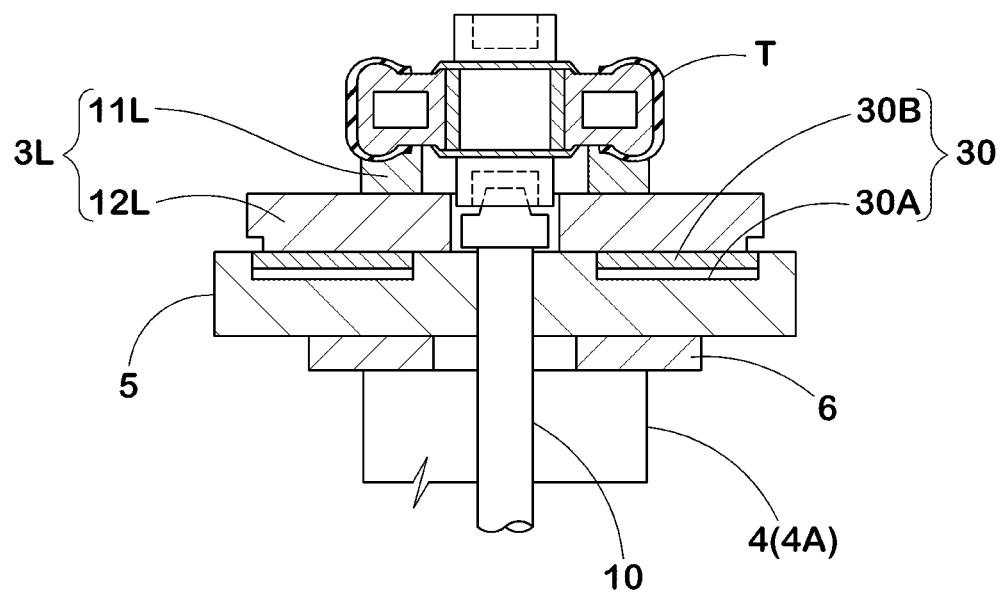
FIG. 3 is a cross-sectional view of a lower mold with a base portion, a first ring and a lower plate.

As illustrated in FIG. 3, the lower mold 3L according to the embodiment includes a lower side mold 11L for molding a lower sidewall portion and a lower bead portion of the green tire, and a lower platen 12L for heating and supporting the lower side mold 11L. The lower platen 12L is attached on the lower plate 5.

Figure 2:
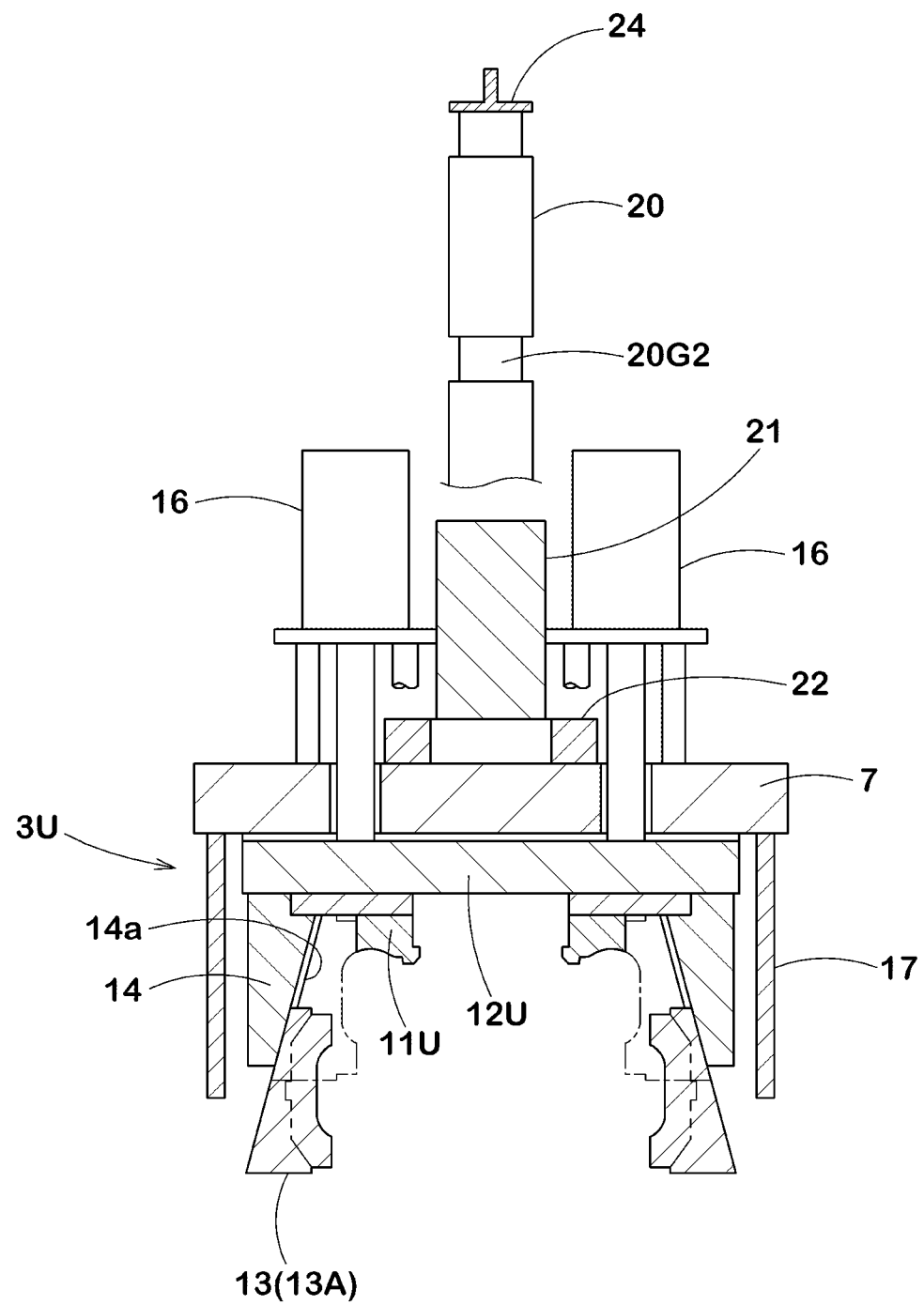
FIG. 2 is a cross-sectional of an upper mold with a reinforcing beam, a second ring and an upper plate.

As illustrated in FIG. 2, the upper mold 3U according to the embodiment includes an upper side mold 11U for molding an upper sidewall portion and an upper bead portion of the green tire, a tread mold 13 for molding a tread portion of the green tire, an upper platen 12U for heating the upper mold 3U, and a cylindrical container 14 for expanding and contracting the tread mold 13.

The upper platen 12U is supported by the upper plate 7 movably up and down through an actuator, e.g., a hydraulic cylinder 16. The container 14 and the upper side mold 11U are fixed to an under surface of the upper platen 12U. The tread mold 13 is configured as a plurality of circumferentially divided segments 13A. Each of the segments 13A is supported by a guide 14a provided on an internal cone surface of the container 14 slidable up and down along the internal cone surface. Thus, in the upper mold 3U, by a relatively movement of the segments 13A up and down with respect to the container 14, the tread mold 13 can be expandable (shown in solid lines) and contractible (shown in one dotted line). Note that the reference character "17" in FIG. 2 is a protecting cover which is fixed to the upper plate 7 to surround the upper mold 3U.

Figure 5:
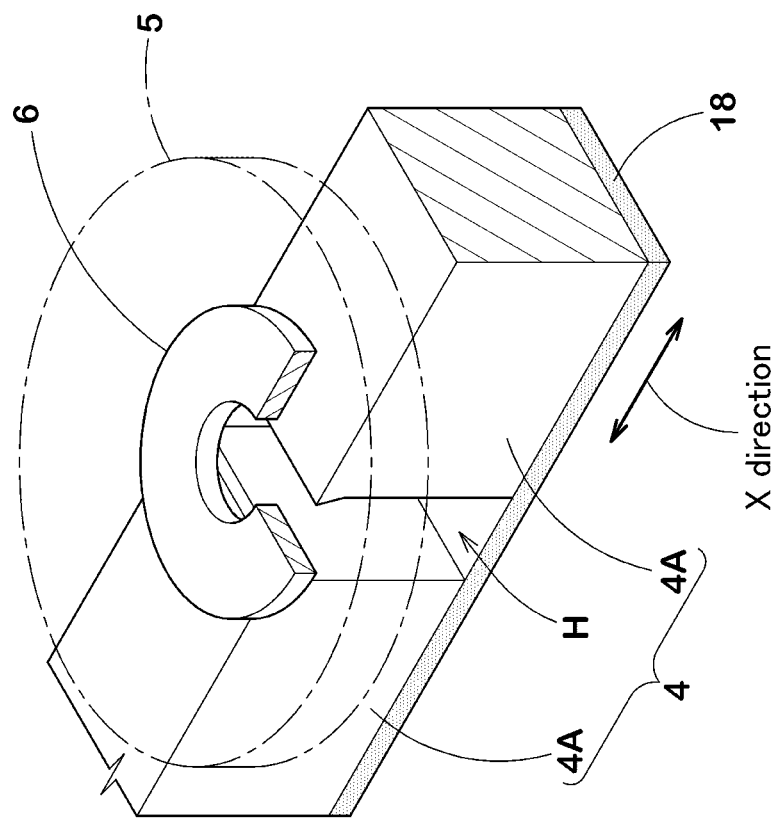
FIG. 5 is a perspective view of the base portion, the first ring and the lower plate.

Next, as illustrated in FIGS. 1, 3 and 5, the base portion 4 constitutes a base for the tire vulcanizing apparatus 1, and receives load when closing the vulcanization mold 3. In this embodiment, the base portion 4 includes a pair of mounting bases 4A which face with each other in an X direction so as to have a gap H therebetween for arranging the central mechanism device 10. The mounting bases 4A are fixed on a bed plate 18.

The lower plate 5, for example, is supported by the base portion 4 through the first ring 6. The first ring 6 is configured to have a circular shape with a center corresponding to an axial center of the vulcanization mold 3, and is arranged over the pair of mounting bases 4A so as to straddle the gap H. The lower mold 3L is fixed on the lower plate 5.

Figure 4:
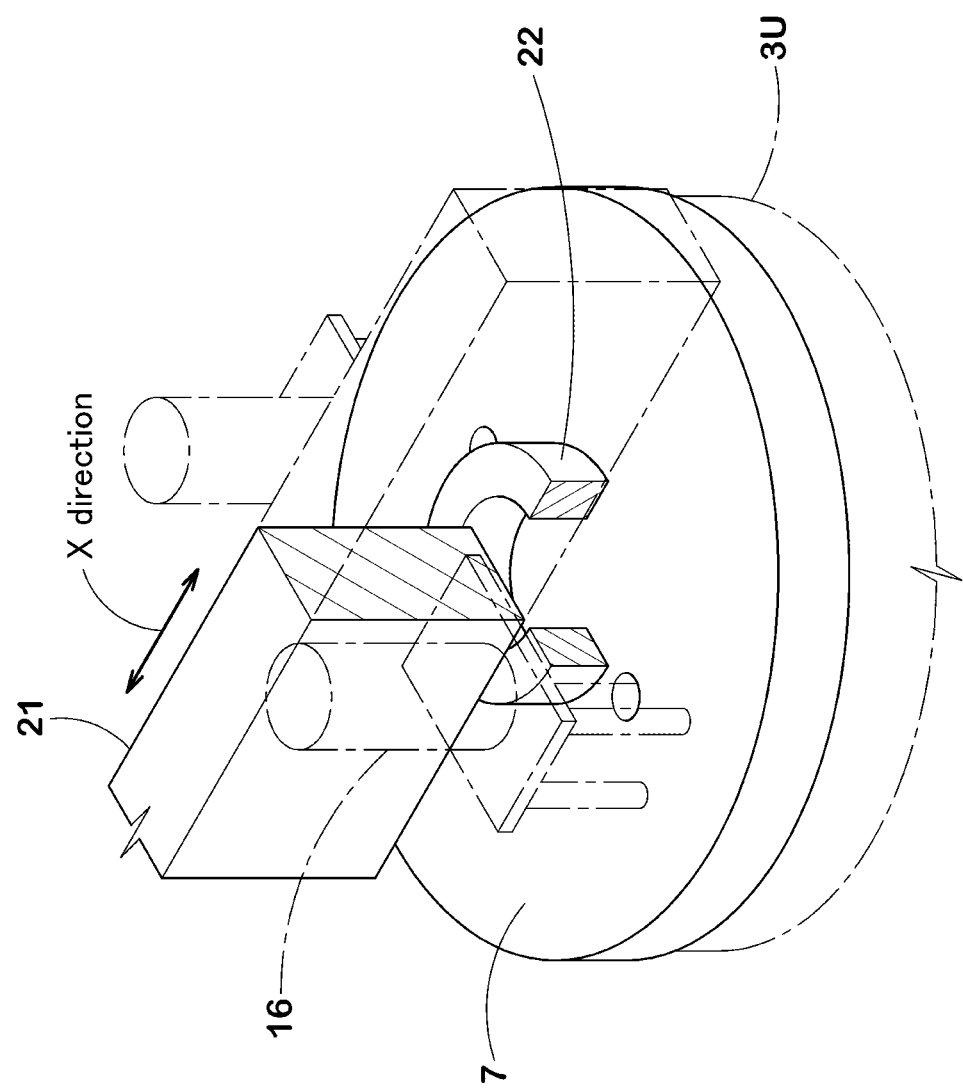
FIG. 4 is a perspective view of the reinforcing beam, the second ring and the upper plate.

As illustrated in FIGS. 1, 2 and 4, the upper mold 3U is fixed to the upper plate 7 such that the upper mold 3U faces the lower mold 3L up and down.

The lifting device 8 can move the upper plate 7 up and down between a lower location PL in which the upper mold 7 positions closing the vulcanization mold 3 and an upper location PU in which the upper mold 7 positions opening the vulcanization mold 3.

In this embodiment, the lifting device 8 includes a pair of tie rods 20, a horizontal reinforcing beam 21, a second ring 22, and a pair of expandable and reducible cylinders 23.

The pair of tie rods 20 are columns extending vertically from the base portion 4, and are arranged at two positions which are away from the vulcanization mold 3 in an equal distance in the X direction. In this embodiment, the respective lower ends of the tie rods 20 are fixed to the respective mounting bases 4A, and the respective upper ends of the tie rods 20 are connected by a horizontal connecting beam 24. Further, the tie rods 20 are provided with two locking grooves 20G1 and 20G2 (hereinafter, they may be referred to 20G, collectively) for stopping and locking the upper plate 7 at the respective lower location PL and the upper location PU.

The reinforcing beam 21 is guided by the pair of tie rods 20 slidable up and down. The reinforcing beam 21 extends horizontally in the X direction, and has two guide holes 21H for receiving the tie rods 20 on both end sides. In this embodiment, the reinforcing beam 21 has a lengthwise long rectangular shaped cross-section in order to enhance the ability for supporting load when closing the vulcanization mold. Further, the upper plate 7 is fixed integrally on a lower surface of the reinforcing beam 21 through the second ring 22. The second ring 22 also has a circular shape with a center corresponding to the axial center of the vulcanization mold.

The pair of cylinders 23 such as oil hydraulic cylinders, are supported on its lower end sides by the base portion 4. Further, upper end sides of the pair of cylinders 23 are connected to the reinforcing beam 21. In this embodiment, the respective lower end sides of cylinders 23 are fixed on side end surfaces of the respective mounting bases 4A in the X direction, and the respective upper end sides of cylinders 23 are connected to the respective end sides of reinforcing beam 21 in the X direction.

Here, the first ring 6, the second ring 22, the lower plate 5, and the upper plate 7 are arranged such that these center locations correspond to the center location of the vulcanization mold 3. The cylinders 23 and the tie rods 20 are arranged such that these axes pass a straight line along the X direction which passes the center of the vulcanization mold 3.

Figure 6A:
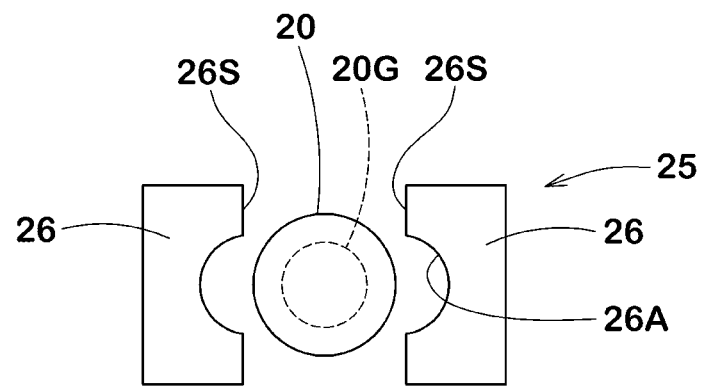
FIGS. 6A and 6B are a plan view and a side view of a clamp device, respectively.
Figure 6B:
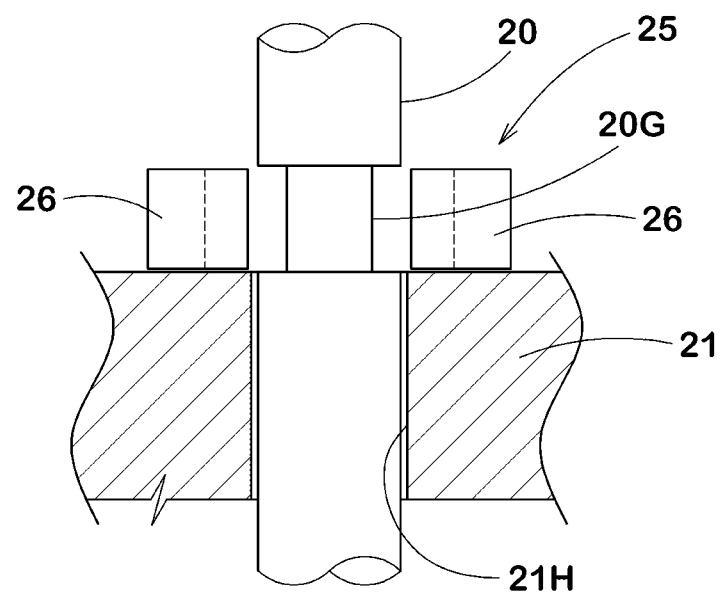

In this embodiment, the lifting device 8 further includes clamp devices 25 attached to the reinforcing beam 21. The clamp devices 25 can clamp the tie rods 20 at the lower location PL as well as the upper location PU. As illustrated in FIGS. 6A and 6B, each of the clamp devices 25 according to the embodiment includes a pair of half-split shaped clamp pieces 26 arranged on an upper surface of the reinforcing beam 21 on both sides of the guide holes 21H. Each of the clamp pieces 26 includes a half-split circular internal recess 26A on a facing surface 26S which faces the other one of the clamp pieces 26. Each of the clamp pieces 26, for example, can be moved by an actuator such as a hydraulic cylinder (not illustrated) to position in contact and separate with each other. Thus, when the facing surface 26S of the clamp pieces 26 are in contact with each other or located very closely, the half-split circular internal recess 26A can engage the locking grooves 20G so as to clamp the tie rod 20. On the other hand, when the facing surfaces 26S are separated away from each other, the clamp pieces 26 can release the tie rod 20.

As illustrated in FIG. 3, the lower plate 5 of the tire vulcanizing apparatus 1 is provided with a pressurizing device 30 which tightens up the upper and lower molds 3U and 3L with each other at the lower location PL. The pressurizing device 30 is configured to include a circular groove 30A formed on the upper surface of the lower plate 5 and having a center location that corresponds to the center location of the vulcanization mold 3, and a circular pressurizing plate 30B supported slidable by the circular groove 30A up and down. Then, by providing a high-pressure fluid in a space between the bottom surface of circular groove 30A and the pressurizing plate 30B, the pressurizing plate 30B can lift the lower mold 3L to tighten up the upper and lower molds 3U and 3L with each other.

Figure 7:
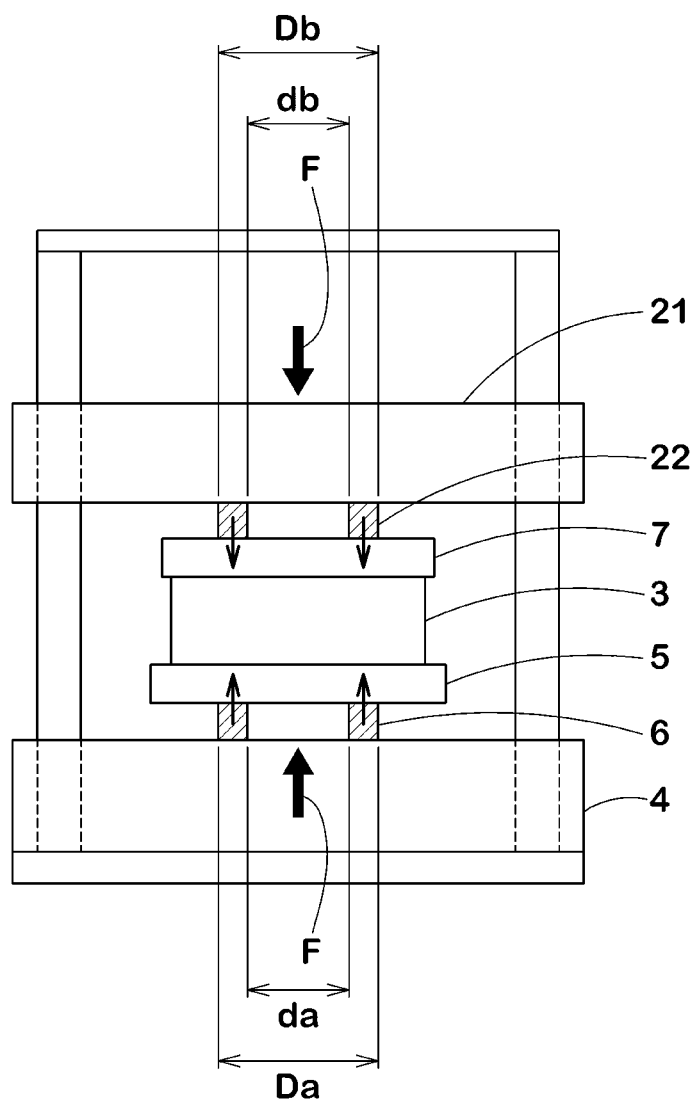
FIG. 7 is a conceptual view for explaining the effect of the disclosure.
Figure 8:
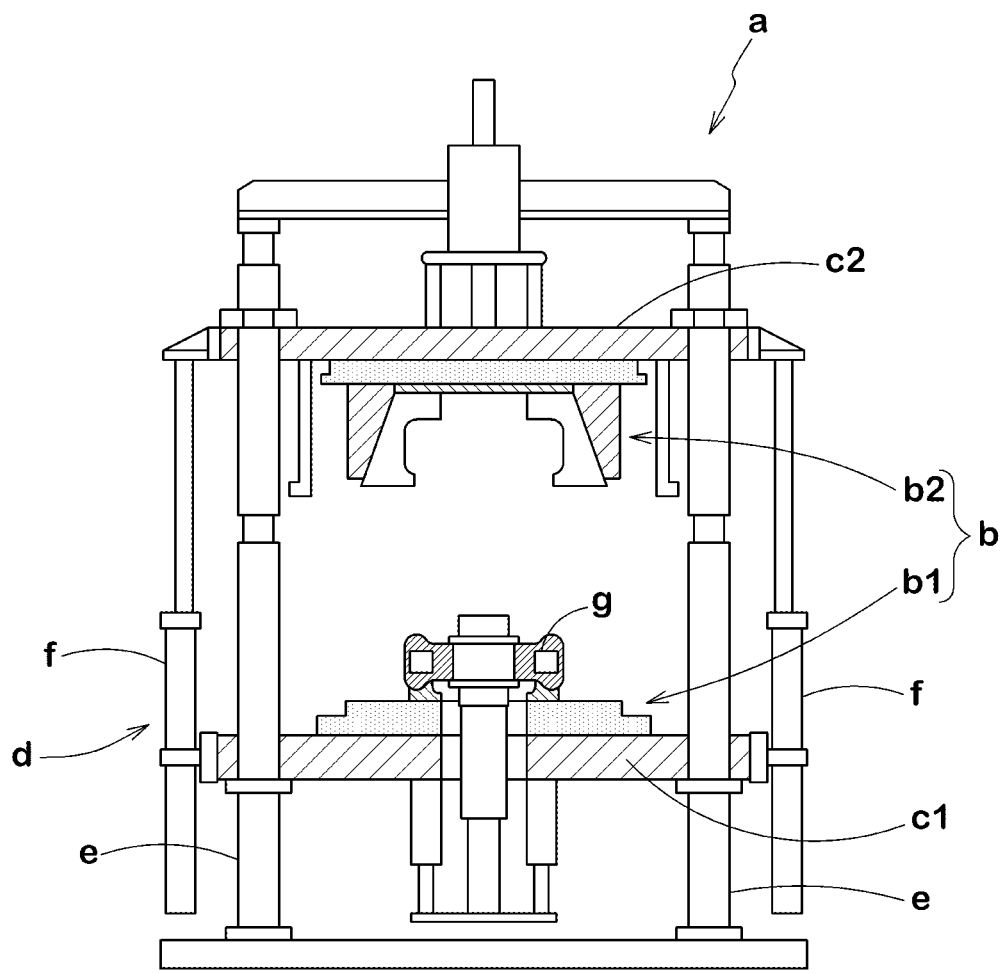
FIG. 8 is a front view of a conventional tire vulcanizing apparatus.

In the tire vulcanizing apparatus 1 as described above, as illustrated in FIG. 7, the first ring 6 is arranged between the base portion 4 and the lower plate 5, and the second ring 22 is arranged between the reinforcing beam 21 and the upper plate 7. Thus, the tightening force F acting on the base portion 4 and the reinforcing beam 21 can be transmitted to locations of the lower plate 5 and the upper plate 7 evading the centers thereof through the first ring 6 and the second ring 22, respectively. That is, the pressure acting on the vulcanization mold 3, which tended to concentrate on the center sides, can be dispersed in a radially wide region, and thus uniformizing. Therefore, strain of the vulcanization mold can be reduced, resulting in expanding life thereof.

In order to disperse the pressure effectively, outer diameters Da and Db of the first ring 6 and the second ring 22, respectively, are preferably smaller than an outer diameter DO of the vulcanization mold 3. Note that the outer diameter DO (not illustrated) of the vulcanization mold 3 is the maximum outer diameter of the vulcanization mold 3, and which corresponds to an outer diameter of the upper platen 12U (or the lower platen 12L), for example. The inner diameter da of the first ring 6 is preferably larger than an inner diameter of the lower plate 5. Further, the inner diameter db of the second ring 22 is larger than a width of the reinforcing beam 21.

In another aspect, the base portion 4 can be formed as a single blocked portion which is not divided into such two mooting bases 4A. In this aspect, the base portion 4 has a hole corresponding to the gap H for arranging the central mechanical device 10.

While the particularly preferable embodiments in accordance with the present disclosure have been described in detail, the present disclosure is not limited to the illustrated embodiments but can be modified and carried out in various aspects.

Example

In order to confirm the effect of the disclosure, a tire vulcanizing apparatus having the structure as shown in FIG. 1 which includes the first and second rings was manufactured as an example. As a comparative example, a tire vulcanizing apparatus having no first and second rings was also manufactured. Then, using two apparatus, load test was conducted. From the test results, regarding strain occurring on the center side of the tire mold, although the comparative example was 1.0 to 2.0 mm, the example was equal to or less than 0.05 mm.

What is claimed is:

1. A tire vulcanizing apparatus comprising:
   a vulcanization mold comprising a lower mold and an upper mold to define a tire mold cavity for vulcanizing a green tire together with a rigid core on which the green tire is formed;
   a base portion;
   a lower plate to which the lower mold is attached, the lower plate supported by the base portion;
   a first ring having a circular shape with a center corresponding to an axial center of the vulcanization mold and arranged between the base portion and the lower plate;
   an upper plate to which the upper mold is attached so as to face the lower mold up and down; and
   a lifting device for moving the upper plate up and down between a lower location in which the upper mold is in contact with the lower mold to close the vulcanization mold and an upper location in which the upper mold positions opening the vulcanization mold, wherein
   the lifting device comprises a pair of tie rods extending vertically from the base portion, a horizontal reinforcing beam movably guided by the pair of tie rods and supporting the upper plate integrally, and a second ring having a circular shape with a center corresponding to the axial center of the vulcanization mold and arranged between the reinforcing beam and the upper plate.

2. The apparatus according to claim 1, wherein outer diameters of the first ring and the second ring are smaller than that of the vulcanization mold.

3. The apparatus according to claim 1, the lifting device further comprising a pair of expandable and reducible cylinders, one end side of the pair of cylinders being connected to the base portion, and the other end side of the pair of cylinders being connected to the reinforcing beam.

4. The apparatus according to claim 1, the lifting device further comprising clamp devices, wherein the clamp devices are attached to the reinforcing beam and clamp the pair of tie rods at the lower location and the upper location.

5. The apparatus according to claim 2, the lifting device further comprising a pair of expandable and reducible cylinders, one end side of the pair of cylinders being connected to the base portion, and the other end side of the pair of cylinders being connected to the reinforcing beam.

6. The apparatus according to claim 2, the lifting device further comprising clamp devices, wherein the clamp devices are attached to the reinforcing beam and clamp the pair of tie rods at the lower location and the upper location.

7. The apparatus according to claim 3, the lifting device further comprising clamp devices, wherein the clamp devices are attached to the reinforcing beam and clamp the pair of tie rods at the lower location and the upper location.

* * * * *